(12) United States Patent
Johnson et al.

(10) Patent No.: US 8,731,241 B2
(45) Date of Patent: May 20, 2014

(54) ACTIVITY MAPPING SYSTEM

(75) Inventors: Neil Johnson, Milton Malsor (GB); Glyn Cowe, Market Harborough (GB)

(73) Assignee: Infrared Integrated Systems Limited, Northampton (GB)

(*) Notice: Subject to any disclaimer, the term of this patent is extended or adjusted under 35 U.S.C. 154(b) by 689 days.

(21) Appl. No.: 12/977,745

(22) Filed: Dec. 23, 2010

(65) Prior Publication Data

US 2011/0158482 A1    Jun. 30, 2011

(30) Foreign Application Priority Data

Dec. 24, 2009 (GB) .................................. 0922560.8

(51) Int. Cl.
*G06K 9/00* (2006.01)
*H04N 7/18* (2006.01)

(52) U.S. Cl.
USPC .......................................... 382/103; 348/143

(58) Field of Classification Search
CPC .......... G06K 9/00335; G06K 9/00771; G06K 9/00832; G06K 9/00362; G06K 9/00664; G06K 9/3241; G06K 9/6253; G06K 9/0021; G06K 9/6262; G06K 9/68; B60N 2/002; G06T 7/20; G06T 2207/30232; G06T 7/004; G06T 7/0075; H04N 1/00037
See application file for complete search history.

(56) References Cited

U.S. PATENT DOCUMENTS

| | | | | |
|---|---|---|---|---|
| 5,465,115 A | | 11/1995 | Conrad et al. | 348/155 |
| 5,574,843 A | * | 11/1996 | Gerlach, Jr. | 345/418 |
| 5,875,108 A | * | 2/1999 | Hoffberg et al. | 700/17 |
| 7,027,621 B1 | * | 4/2006 | Prokoski | 382/118 |
| 7,106,885 B2 | * | 9/2006 | Osterweil et al. | 382/103 |
| 7,505,604 B2 | * | 3/2009 | Zakrzewski et al. | 382/100 |
| 7,596,242 B2 | * | 9/2009 | Breed et al. | 382/103 |

(Continued)

FOREIGN PATENT DOCUMENTS

| | | | | |
|---|---|---|---|---|
| CN | 101303727 A | 11/2008 | | G06K 9/00 |
| CN | 101567097 A | 10/2009 | | G06M 11/00 |

(Continued)

OTHER PUBLICATIONS

Examination Report under Sections 18(3) from the EPO issued Jan. 19, 2012 in priority application No. GB0922560.8.

(Continued)

*Primary Examiner* — Manav Seth
(74) *Attorney, Agent, or Firm* — Gable Gotwals

(57) ABSTRACT

A system for monitoring the motion of objects is configured to identify objects meeting predetermined criteria appearing in a scene and to track the motion of identified objects across the scene. In a particular embodiment the system is configured to compile statistical data for multiple points or regions to indicate one or both of: the frequency with which objects are initialised at that region or point; and the frequency with which initialised objects cross the region or point. The initialisation data will indicate the areas in the scene where objects are most frequently initialised. If the statistical data shows an area of the scene in which objects are never initialised this might indicate that there is an obstruction between objects that need to be tracked and the detector. The path data will indicate the paths most frequently followed by objects. If there is a particularly well trodden path to and fro in a particular part of the scene this might distort the result of a count of people entering and leaving a region in the scene.

15 Claims, 4 Drawing Sheets

(56) References Cited

U.S. PATENT DOCUMENTS

| | | | |
|---|---|---|---|
| 7,664,292 B2* | 2/2010 | van den Bergen et al. | 382/103 |
| 2002/0167408 A1 | 11/2002 | Trajkovic | 340/573.1 |
| 2004/0131249 A1* | 7/2004 | Sandrew | 382/162 |
| 2004/0204919 A1* | 10/2004 | Li | 702/189 |
| 2008/0114633 A1 | 5/2008 | Wolf et al. | 705/7 |
| 2008/0212099 A1 | 9/2008 | Chen | 356/408 |

FOREIGN PATENT DOCUMENTS

| | | | | |
|---|---|---|---|---|
| CN | 101587606 A | 11/2009 | | G07C 6/00 |
| DE | 10 2006 044 298 B3 | 1/2008 | | G07C 9/00 |
| EP | 2 230 629 A2 | 9/2010 | | G06K 9/62 |
| GB | 2 392 243 A | 2/2004 | | G06T 7/00 |
| JP | 2005063303 A | 3/2005 | | G06M 7/00 |
| JP | 2006285409 A | 10/2006 | | G06Q 50/00 |
| WO | WO 2005/062714 A2 | 7/2005 | | |
| WO | WO 2008/058296 A2 | 5/2008 | | |
| WO | WO 2008/132741 A2 | 6/2008 | | G06T 7/20 |

OTHER PUBLICATIONS

Combined Search and Examination Report under Sections 17 & 18(3) from the EPO issued Jun. 11, 2010 in priority application No. GB0922560.8.

* cited by examiner

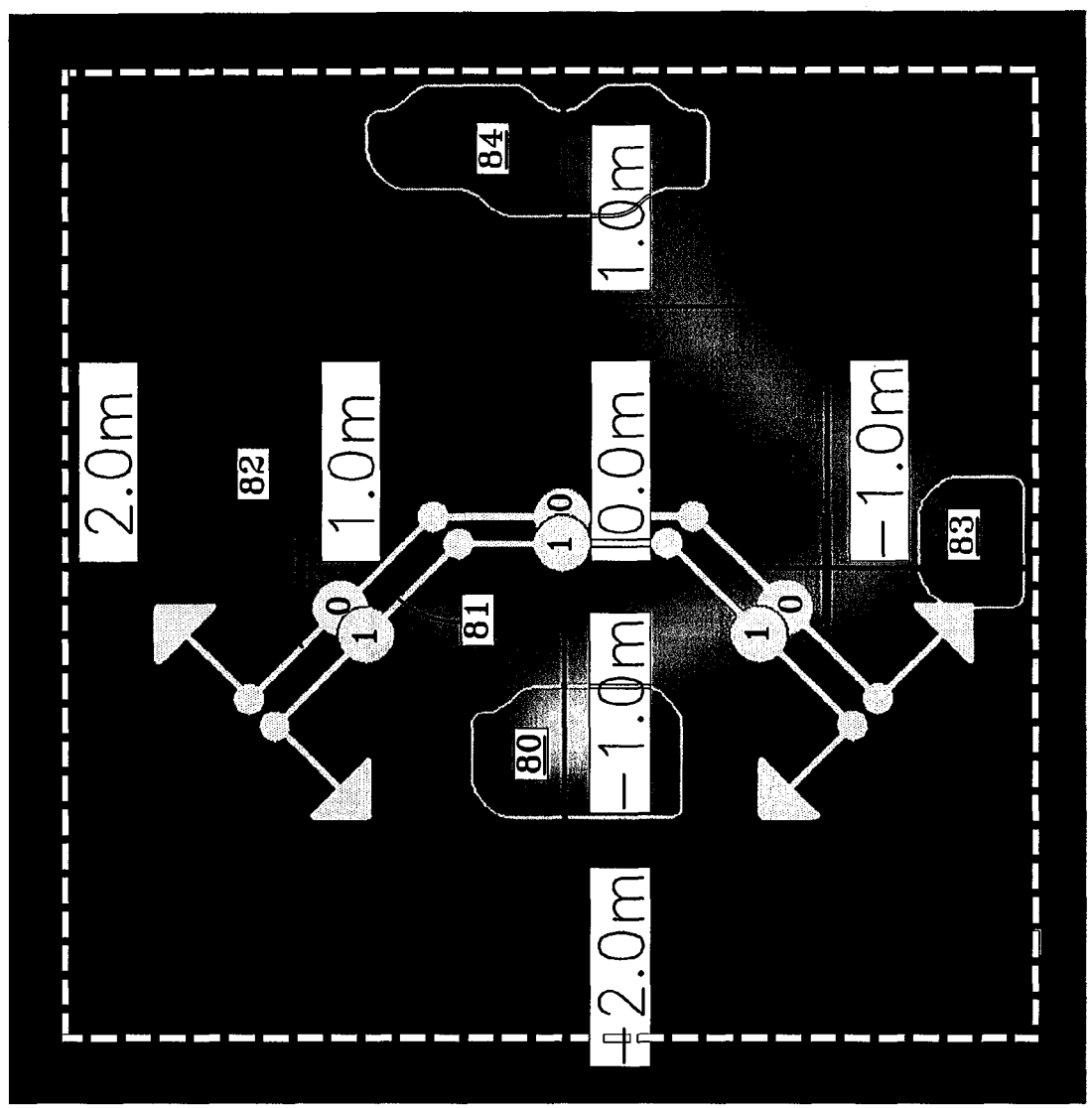

ACTIVITY MAPPING SYSTEM

The present invention relates to systems for monitoring the motion of objects. One example is a people counting system based around an imaging array that may detect visible, near IR or thermal infrared radiation. The invention is also applicable to other people or object tracking systems however the object (otherwise known as "target") location data is derived, for example acoustic proximity scans, radar and laser scanning imagers. The invention is also applicable to other detection applications other than people counting, for example queue monitoring.

In current systems, tracking or detection algorithms interpret the imaged scene and track the movement of objects (typically people) and count these objects for example when they cross a nominal line position. Various embellishments to this exist including multiple lines and large fields of view built up from a matrix of detectors.

In order to confirm the correct configuration and operation of an installation it is typically necessary to validate the operation by manually counting the objects either at the scene live or remotely via video (either live or recorded).

The validation results will either confirm that operation is satisfactory or that there is an error but will not in themselves diagnose any problem. In order to determine the cause of any tracking or counting error it will be necessary to analyse the scene over a period of time and look for anomalous behaviour—this may be for example because the count lines have been positioned badly or because there is an obstruction—either of these may mean that objects are not tracked at the point that they need to be in order to be counted.

In this type of tracking and counting system, algorithms interpret the data of the scene from the spatial positioning system and will determine whether an object exists and should be tracked according to predetermined criteria—this first stage is referred to as target initialisation. Having initialised a target, it is then tracked by algorithms.

It is increasingly the case that systems are deployed across large geographical regions and there is a desire to manage these from a central location without the need to visit sites. Visiting the site of the installation dominates cost of ownership.

Detectors for this type of system may be accessible via a modem, data logging device that connects the unit to a location's local network or increasingly by using detection devices with integrated network connections (TCP/IP) that may be accessed over the internet.

The problem with the current systems of the form described above is that it is time consuming to audit an installation and may involve travel time if done live on site. Additionally, it may take time to diagnose the problem by observation and require relatively high grade technical support. It is therefore desirable that remote installations can be conveniently accessed and that appropriate tools are available to enable them to be managed efficiently without needing to visit the site.

It is desirable to have a solution that will provide diagnostic information enabling the validation technician to confirm that basic settings are correct and to quickly confirm that the installation and configuration are correct within the context of the location being monitored. It is desirable to be able to make appropriate necessary changes prior to beginning a formal audit.

GENERAL

In a preferred aspect there is provided in the following a system for monitoring the activity of objects comprising:

a detector arranged to receive radiation from a scene;
readout apparatus for monitoring and processing signals from the detector to identify objects meeting predetermined criteria appearing in the scene and to monitor the activity of identified objects within the scene; and
data processing and storage apparatus;
wherein:
the data processing and storage apparatus is configured to compile statistical data over time indicating the occurrence of one or more object behaviours; and to determine the distribution of the one or more object behaviours over a contiguous area defining all or part of the scene.

In the situation where the contiguous area defines part of the scene, the distribution may be determined over one or more additional contiguous areas each defining part of the scene. These areas may be discrete or they may overlap.

In one possible implementation, the data processing apparatus is configured to compile statistical data over time indicating the frequency of one or more object behaviours. Each contiguous area may take the form of multiple regions or points in the scene that are adjacent to each other.

The contiguous areas or the adjacent regions or points may for example define a path across or within the scene. Alternatively the regions or points may define a differently shaped area within the scene. In these two examples the adjacent regions or points define at least a sub-area of the scene. In another example of how the system might be used, the whole of the scene being viewed by the detector may be divided into adjacent regions or points, for example in a grid arrangement or other two dimensional array, so that the occurrence of object behaviours over the whole of the scene can be monitored.

By examining contiguous areas or adjacent regions or points, as opposed to disparate points spread over the scene, the set-up of the detection system can be fine-tuned to the requirements of a particular installation based on where activity is actually observed to occur within the particular scene.

Because the data is accumulated over time and is related at least one contiguous area in the scene, the data can be used to diagnose faults in the set-up of the system as will be described in more detail below. The term "fault" as used herein is intended to encompass any aspect of the set-up that results in sub-optimal performance of the system.

It is known to monitor the characteristics of object behaviour in video surveillance systems for example. The present invention is concerned with how object behaviour can be used to make deductions about the set-up of the system and therefore requires such data to be accumulated over time and related to contiguous areas enclosing multiple points or regions of the scene.

Information (i.e. radiation) from the scene can be electromagnetic or acoustic. Example systems use infrared, video, radar, LIDAR or acoustic positioning.

The one or more object behaviours may be selected from: first instance of meeting the predetermined criteria; crossing a region or point; dwelling at a region or point for more than a certain time; and leaving the scene, to name a few examples.

In a preferred embodiment of the invention the predetermined criteria are the criteria that an object has to meet in order to be first recognised as an object. This is also referred to as "initialisation". One of the purposes of initialisation is to reduce false tracking that might result from activity in the scene which is not due to object movement. For example with infrared detectors there might be thermal patterns in a scene that are not due to object movement.

The point or region at which an object first meets the predetermined initialisation criteria, i.e. is initialised, is an important factor in determining whether a system is correctly set up. For example if objects are not initialised near to a doorway this might indicate that the field of view of the detector is obscured in some way. Also, in a situation where objects are counted as they cross a count line, it is important that the objects are not initialised too close to the count line, otherwise there is a possibility that they cross the count line before they first meet the predetermined, i.e. initialisation, criteria, and are therefore not included in the count of number of objects crossing the line.

Having initialised objects it is possible to use other selection criteria so that only the activity of selected objects is monitored.

The contiguous area(s) or set of points or regions for which data is compiled may be dynamically adjusted, for example in response to trends in object behaviour. In one possible implementation data is compiled for a set of points or regions defining a path and if objects appear to be leaving the path before it ends, neighbouring regions or points may be brought in to determine where objects are going and whether the normal path has shifted. This might indicate the introduction of an obstacle in the scene that is impeding the movement of the objects. By compiling data only for the contiguous area, e.g. points or regions defining the path, processing power is saved as compared to compiling data for the whole scene, whilst still allowing behaviour variability over the entire scene to be represented.

Similarly, for a detector monitoring the activity of people queuing, a contiguous area, e.g. set of points or regions may correspond to where a queue usually builds up and may be moved if the queue appears to have shifted.

In another possible implementation of the system, data is compiled for a set of points defining a line used for example to count objects entering and/or leaving a part of the scene. The use of a "count line" is well known in people counting. The present system can be used to determine one or more points or regions along the line at which objects most frequently cross and therefore provides information additional to that provided by known counters.

The readout apparatus and the data processing and storage apparatus are preferably housed with the detector in a single self contained unit. A transmitter may also be provided and this may also be housed with the detector. There is thus provided a device that is capable of transmitting the statistical data to a remote location for further analysis. However it is equally possible for the statistical data to be compiled at a remote location from the detector.

The system may comprise multiple detectors with respective readout apparatus. In this situation it is preferable for the detectors to communicate with one another and for one or more detectors to act as "master" detector for multiple detectors, i.e. at least one data processing and storage apparatus associated with one of the detectors is arranged to compile statistical data for multiple detectors. The data processing and storage apparatus associated with the master detector might compile the statistical data for the multiple detectors for which it is master.

A variety of criteria may be used to select objects to be monitored. Usually an object will have to satisfy some minimum criteria designed, for example, to distinguish a mobile object from a stationary object. Additionally or alternatively objects may be selected according to whether or not they have crossed a line in the scene (this may be distinct from a count line used to count the number of people entering or leaving the scene), their direction of travel, speed of travel, time slot, e.g. time of day, week etc, some sort of identifier (eg RFID tag) or object type.

The statistical data can be evaluated in a number of ways. It can be processed for rendering on a display device as all or part of a visual representation of the scene(s) viewed by the detector(s). The display may show all or part of the scene. The data can then be evaluated by an operator in ways which will be described in more detail below and if necessary adjustments to the detector set-up may be made. A convenient way to represent the data is in the form of a two dimensional representation of the points or regions in the scene (or alternatively the whole scene) with different frequencies of object behaviour being visually distinguished, such as by different brightness or chromaticity or in any other way. Additionally or alternatively the data can be represented in the form of contours similar to those used in geographical maps, for example with contour lines joining points or regions of equal frequency. Where more than one object behaviour is monitored, each can be shown in the same visual representation with one object behaviour being visually distinguished from the other(s). For example, contours or boundaries may be used for one kind of behaviour whilst grayscale or chromaticity may be used for another. The representation of the accumulated data in this way, rather than a simple "snapshot" of the current situation, is a powerful diagnosis tool.

The possible adjustments generally fall into two categories, configuration and installation. As used herein, "configuration" relates to the parameters according to which the system operates such as calibration. "Configuration" parameters can also include specific implementation parameters such as tracking settings, counting settings and modes as well as parameters against which the one or more object behaviours is judged such as the position of a crossing line in an object counter. Such parameters are generally electronically imposed and are remotely adjustable. "Installation" relates to the physical relationship of the detector or detectors to the surroundings and includes amongst other things the manner of mounting the detector itself, the presence of obstructions to the movement of objects and the presence of obstructions preventing a detector from detecting objects.

The system permits the automatic evaluation of the data and possibly also automatic adjustment of the detector configuration without the data needing to be rendered on a visual display. In the event of detection of a fault an alert may be generated which may impart information about the nature of the fault.

The system may be configured to enable a user to provide input to instruct the data processing apparatus to restart the accumulation of statistical data from a null state or start a new accumulation of data from a null state whilst keeping the existing accumulation going. This could be simply through the provision of a reset button on the housing of a detector unit. Where the data is analysed remotely, preferably reset can also be carried out remotely.

The data processing apparatus may be configured to compile sets of statistical data to indicate at least two characteristics of object behaviour. In the case where the data is rendered on a visual display the scene could be represented and the respective sets of data may be displayed simultaneously with one being visually distinguished from the other. The readout apparatus may be configured to count the number of times that an identified object crosses a line in a scene. In that case, the line could be indicated on the two dimensional representation of the scene.

The appearance of visual representations can be improved by image enhancement techniques as will be described in more detail below. For example, the appearance of images can be improved by applying image processing techniques such as blurring, contrast enhancement and interpolation.

Extracted contours, such as initialisation region boundaries, can be simplified or smoothed by fitting suitable spline functions.

In one possible application of the invention, the readout apparatus may be configured to count the number of times that an identified object crosses a line in a scene and to indicate the line on the two dimensional representation of the scene. The operator may then be able, through a suitable user interface, to adjust the position of the line. Alternatively as noted above the position of the line may be adjusted automatically upon detection of a fault in the set-up of the system.

One example of statistical data is histogram data. Thus in the specific example described below with reference to drawings, a histogram is created with a "bin" corresponding to each region, or cell, in a scene. The statistical data may alternatively be compiled in a database or list. Other possibilities include mixture modelling, kernel density estimation, and vector quantisation.

In the specific example to be described below, the readout apparatus is arranged to track the motion of identified objects across cells, wherein each cell corresponds to a region within the scene and the data processing apparatus is configured to compile statistical data for each of the cells to indicate one or both of:

the frequency with which the first identification of objects in the scene meeting the predetermined criteria occurs when the objects are in that cell; and the frequency with which objects meeting the predetermined criteria cross the cell.

The first set of data, i.e. that indicating the frequency with which the first identification of objects in the scene meeting the predetermined initialisation criteria occurs when the objects are in that cell (initialisation data). This will indicate the areas in the scene where objects are most frequently initialised. This has a number of uses as will be explained in more detail below. For example, if the data shows an area of the scene in which objects are initialised further into the scene than expected this might indicate that there is an obstruction between objects that need to be tracked and the detector.

The second set of data (path data) will indicate the paths most frequently followed by objects. If there is a particularly well trodden path to and fro in a particular part of the scene this might distort the result of a count of people entering and leaving a region in the scene. In that case it might be necessary to reposition the count line or whatever attraction is causing objects to mingle in that area.

The data processing apparatus may be configured to compile sets of statistical data for each of the cells to indicate respectively the frequency with which the first identification of objects in the scene meeting the predetermined criteria occurs when the objects are in that cell; and the frequency with which objects meeting the predetermined criteria cross the cell. The respective sets of statistical data may then be displayed with one overlying the other and one being visually distinguished from the other. For example, in the case of path data, this may be visualised as a monochrome image in which each pixel corresponds to a cell whilst the pixel's brightness corresponds to the relative frequency. In the case of initialisation data, the statistical data may be further processed to produce closed contours which enclose the regions in which the majority of most densely distributed initialisations occur.

There is also preferably provided a method for monitoring the operation of a system for monitoring the activity of objects, the system comprising a detector being arranged to receive radiation from a scene and readout apparatus for monitoring and processing signals from the detector to identify objects meeting predetermined criteria appearing in the scene and to monitor the activity of identified objects within the scene; the method comprising compiling statistical data over time indicating the occurrence of one or more object behaviours, and determining the distribution of the one or more object behaviours over a contiguous area defining all or part of the scene.

In one embodiment, the data may be stored in respective memory locations or counters for points or regions in the scene. In preferred methods, the values in all of the memory locations are divided by a scaling factor ("scaled") when one of the memory locations is full whereby to release memory capacity. Alternatively, the data may be scaled at predetermined intervals, e.g periodically such as daily or weekly, depending on the application. In some situations it is useful to compile respective sections that have been compiled with different scaling factors for comparison. In others it may be useful to compile respective sections that have been scaled at different intervals and therefore have different "decay rates".

The options described in the foregoing paragraph permit a simple and efficient storage and update scheme implementing an 'exponential history' of past events in which the relevance/weighting of past events decreases exponentially over time. In addition, multiple histograms/data sets using differing decay rates can be used to provide views of behaviour over differing timescales.

It will be appreciated that it may be useful to store a reference image or set of data known to be good (e.g. showing satisfactory operation of a detector) for comparison with future images/data in case investigation is required.

As noted above further enhancements may include maps of activity stored by directionality or by conformance to some other relevant criteria, e.g. whether a count line was crossed, time of day, etc.

In its preferred form the system disclosed here allows historical behaviours to be viewed and has the following key features:

Efficient representation.

Efficient and autonomous acquisition and update of information.

Visually intuitive representation of main thoroughfares and routes of peak traffic.

Visually intuitive representation of the areas where first tracking of targets begins.

In conjunction with the previous 2 points, intuitive visualisation of the location of key detection components (e.g. count lines or queue zones).

The validation technician is therefore able to easily determine whether the count lines (or other key detection components) are appropriately positioned, e.g. that count lines are placed both across and fully traversing routes of interest and also ahead of areas of tracking initialisation.

The system and method described above therefore make available complex historical and contextual information in a simple intuitive form to the user/validation technician thereby improving efficiency.

Other benefits include:

Easy problem diagnosis by non-expert personnel.

Rapid remote diagnosis without the need for video observation and/or prolonged observation of system behaviour.

Remote configuration of key system components such as count lines.

Automated warning of potentially mis-configured components such as count lines.

Automated configuration and adaptation of key system components such as count lines.

Remote understanding of scene layout and typical behaviours without the need for video observation.

As noted above the system and method may be configured to generate a warning in the event of detection of a system set-up fault. Examples of warnings that could be generated automatically include:

"count line too close to initialisation region"
"count line ends in a region of high activity"
"count line too close to obstacle"
"count line too close to high dwell region"
"insufficient activity over count line"
"count line direction incorrect"
"insufficient activity within queuing area".

A count line typically comprises a set of adjacent points or regions in the scene.

As will be discussed in more detail below, in a situation where the crossing of a line by an object is detected, a fault condition could be determined if one end of the line is at a point or in a region where the frequency of an object behaviour is greater than a predetermined threshold, and the predetermined threshold may be a proportion of the highest detected frequency of activity.

In the same situation a fault could be determined if the line crosses a region in which the frequency of initialisation exceeds a certain threshold. The boundary of the initialisation region would typically include the points or regions in which the initialisation frequency is above the threshold.

Similarly a fault could be determined if the frequency of object behaviour in the total of the regions or points defining the line is below a certain threshold. The threshold could be determined in terms of the maximum determined frequency of the object behaviour, either over the whole scene or a part of the scene.

In a situation in which the crossing of a line by an object in a particular direction is detected, the line being made up of points or regions in the scene, a fault condition may be determined if more objects are crossing the line in the opposite direction.

In a situation in which objects are monitored in a particular part of a scene, such as an area where people are expected to queue, an alert could be generated in the event of the frequency of a certain object behaviour (e.g. dwelling) over the whole monitored part of the scene being below a threshold, and the threshold might be a proportion of the total or maximum frequency of the object behaviour.

There is also preferably provided a computer readable medium bearing computer readable code executable by one or more processors of a computing system to cause the system to perform the methods described above.

BRIEF DESCRIPTION OF THE DRAWINGS

Embodiments of the system described above will now be described by way of example only and with reference to the accompanying drawings in which:

FIG. 4 is a screen shot of a typical visual representation of statistical data.

DESCRIPTION OF PREFERRED EMBODIMENTS

Figure 1:
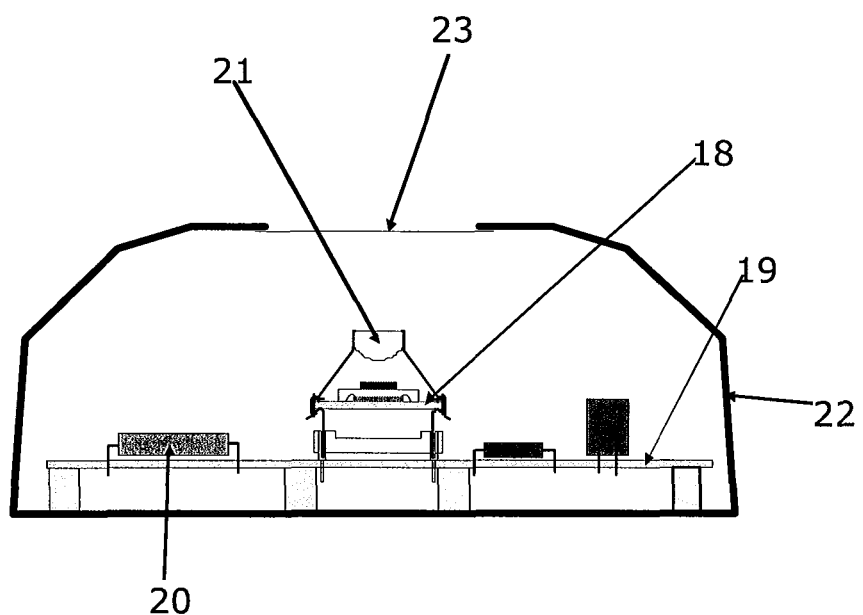
FIG. 1 is a schematic diagram of a detector unit suitable for use in a system for monitoring the motion of objects.

Referring firstly to FIG. 1, a detector unit comprises an infrared detector array and an associated readout circuit in a package 18, mounted on a circuit board 19 supporting a microprocessor 20 and other electronic components. An infrared transmitting lens 21 is mounted directly on the packaged array 18 to focus radiation from a scene onto the array. The foregoing components are protected by a housing 22. The housing has a window 23 that is transparent to infrared radiation. A detector unit of the type shown in FIG. 1 is described in more detail in EP-A-0853237. In a typical installation the detector unit is mounted on the ceiling of a building such as a supermarket.

The scene is divided into "cells". Each cell corresponds to a region in a scene. For the case of monitoring the movement of people, it is suitable to choose the size of the cells such that they project onto a 0.1 m×0.1 m area on a reference or ground plane such as the floor.

Figure 2:
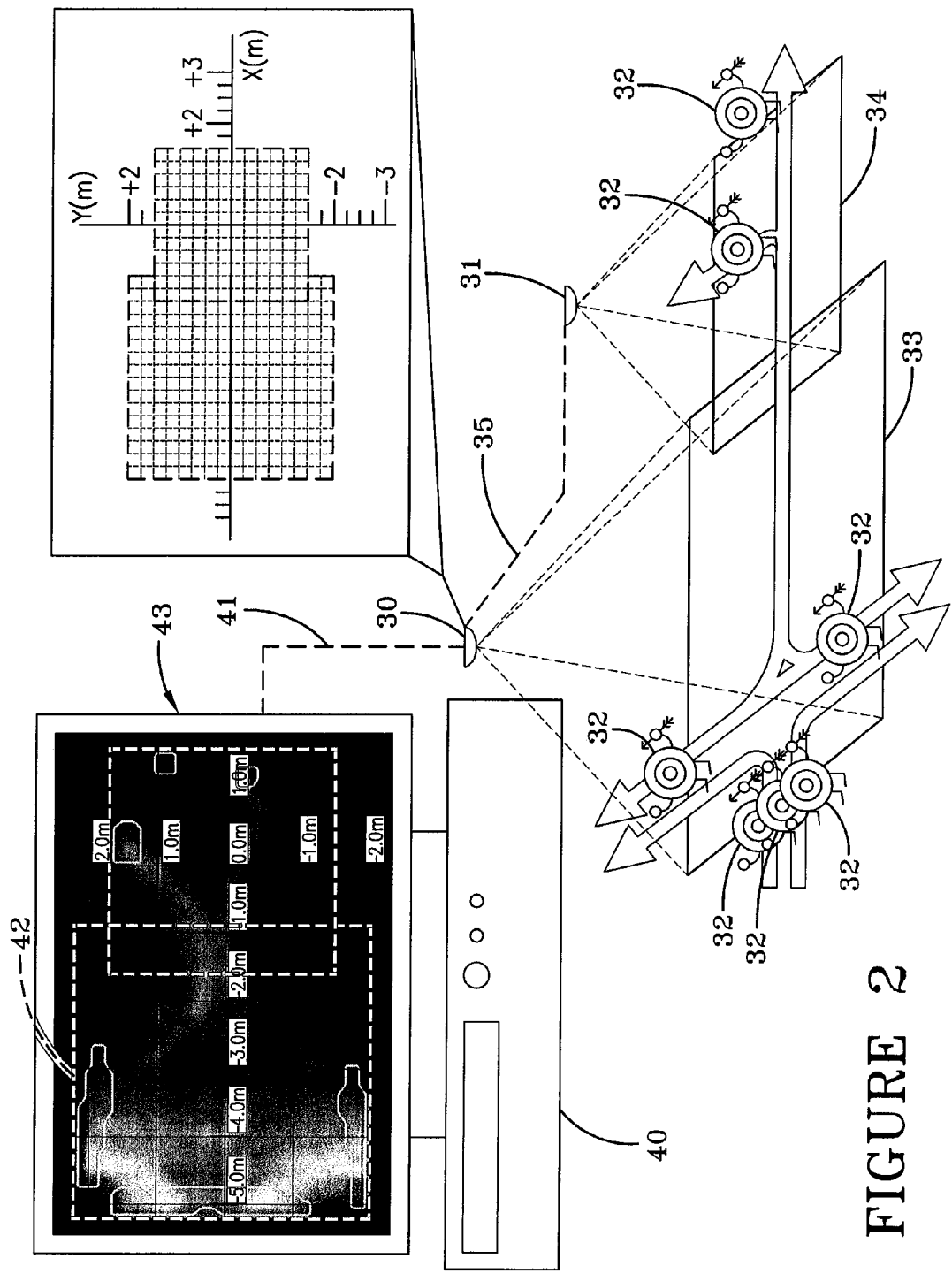
FIG. 2 is a schematic diagram of a complete system.

The system illustrated in FIG. 2 includes two detector units 30, 31 each viewing a rectangular scene 33, 34 respectively. The units 30 and 31 communicate with each other over a wired connection 35. Unit 30 is arranged to be the "master" of the two units. Thus data from unit 31 is sent to unit 30 where the statistical data is compiled. Unit 30 communicates with a remote personal computer 40 acting as host system, for example over an internet connection 41, where the statistical data is processed for rendering an image 42 on display device 43. Preferably the image representation is corrected for distortion and then represented on a Cartesian ground plane. The system is appropriate to application in either the imaging or another plane such as a representation of the imaging plane corrected for distortion by the optics. The personal computer will also have a user interface, not shown.

The system and method are scalable and may be implemented for larger areas of coverage by linking detectors together to form a matrix. In the preferred implementation the targets from all detectors are re-mapped onto a continuous ground plane to ensure correct handling of targets that may be seen by more than one detector.

The grid on the right of FIG. 2 shows how the respective scenes being viewed by the detectors are divided into cells. Each square in the grid corresponds to a cell. The example system described here has the capability to compile both sets of statistical data described above, namely (1) initialisation, i.e. where an object first meets predetermined initialisation criteria, and (2) path, i.e. object crossing cell. One way to achieve this is by providing data storage at the unit 30 having a memory location allocated to each cell which is incremented each time an object 32 is initialised in the cell. A separate memory location allocated to each cell will then be incremented each time a previously initialised object traverses the cell. Initialisation is well understood in the field of tracking objects and techniques for initialisation will be familiar to those skilled in the art. Criteria which are used in initialisation will vary from one application of the tracking technology to another. Examples of initialisation criteria will depend on the technology being used to recognise an object and include shape, size and motion characteristics for example. Having initialised objects, other criteria can be used to select objects whose activity is to be monitored (and filter out objects that are to be ignored) such as whether or not an object has crossed a line in the scene (this may be distinct from a count line used to count the number of people entering or leaving the scene), direction of travel, speed of travel, time slot, e.g. time of day, week etc, some sort of identifier (eg RFID tag) or object type.

The foregoing paragraph describes a simple "histogram" method of compiling the statistical data. The person skilled in this art will appreciate that other methods are possible as noted above such as the use of a database or list, mixture modelling, kernel density estimation, and vector quantisation.

The image 42 on the screen 43 is an example of the manner in which the data may be rendered as a visual image and will be discussed in more detail below.

Figure 3:
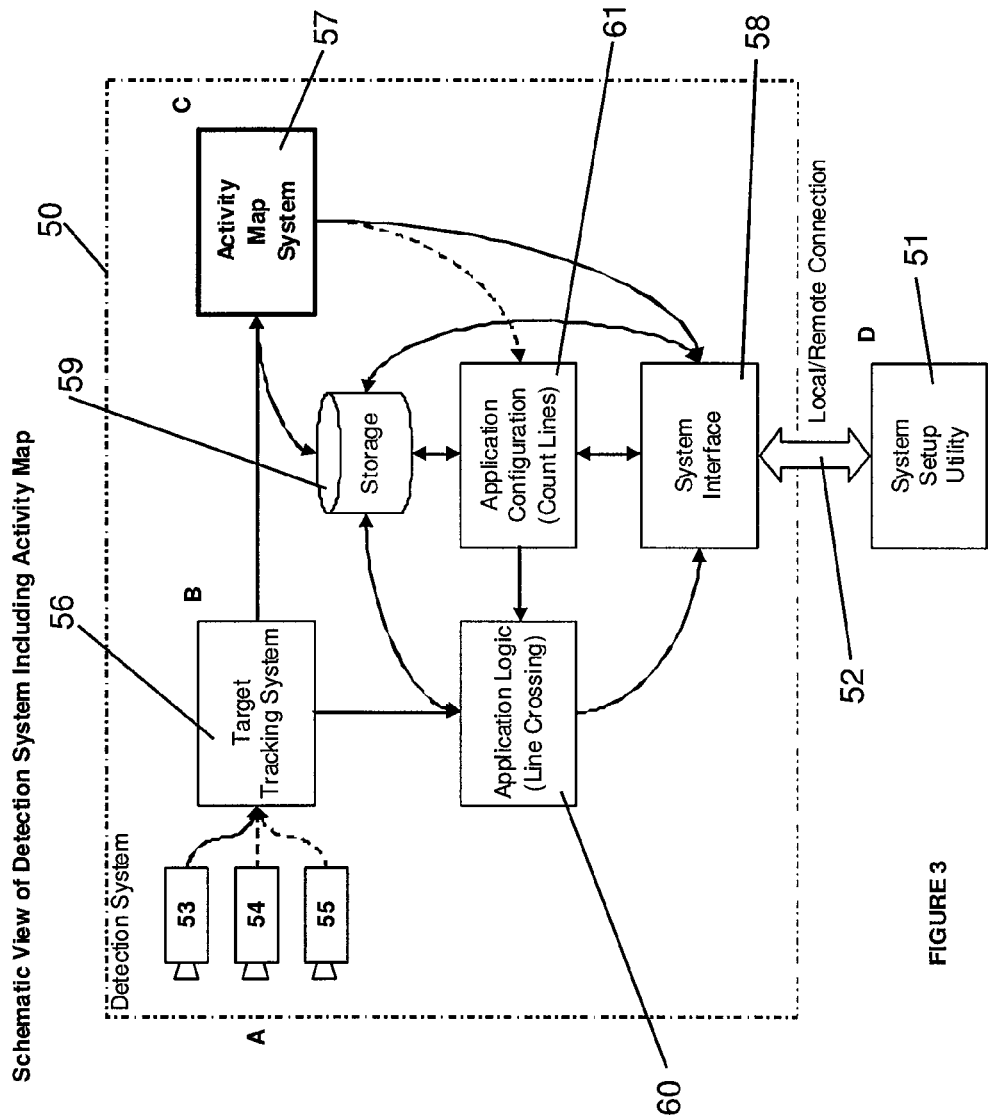
FIG. 3 is a schematic diagram illustrating the data processing components used in the system of FIG. 2.

FIG. 3 shows an arrangement comprising a detection system 50 communicating with a system set-up utility 51 over a remote or local connection 52. The system setup utility may simply comprise PC 40 as shown in FIG. 2. In the example of FIG. 3 there are three detector units 53, 54, 55 each supplying readout signals to target tracking system 56. The target tracking system 56 performs initialisation of objects and tracking of initialised objects. Typically each detector unit will have its own target tracking system although only one is shown in the figure. Data from the target tracking system is supplied to the activity map system 57 where the statistical data is compiled, making use of data storage 59. In one example, the data from the target tracking system includes the location of object initialisations together with target location updates at regular intervals. This data is supplied to the setup utility 51 via system interface 58.

As well as being supplied to the activity map system 57, the above described data from the target tracking system is also supplied to application logic 60 where, for example, the frequency that a line is crossed is determined in order to count the number of people in the building at any time. The application configuration indicated at block 61 can be altered in response to input at the system setup utility via system interface 58. Configuration details are stored at storage 59. The dotted line from the activity map system to the application configuration indicates the possibility that the configuration can be automatically adjusted following analysis of the statistical data generated by activity map system 57 using a suitable algorithm.

FIG. 4 shows a visual representation of statistical data from a single detector mounted above an area near to a doorway. The representation is a two-dimensional representation of the scene, or part of the scene, being viewed by the detector. In this example the frequencies of two object behaviours are shown, initialisation and cell crossing. The initialisation regions 80, 83, 84 are outlined in order to visually distinguish them from the traversal data. They could be further defined by contours. The image is on a black background and the traversal count values for each cell are represented by grayscale with the more frequently used areas being more white. The image does not show raw data but rather is smoothed using well known techniques to make it more intuitive.

In the example of FIG. 4 two count lines 81, 82 are shown, one for objects entering the area and one for objects leaving the area. Signal processing techniques can be used to determine the direction in which the object is travelling. It will be noted that objects are not initialised at the left edge of the scene but rather do not "appear" until 1 metre to the right of the left edge at the region 80. This is because the top of a doorway obscures objects at the leftmost metre-wide strip from the detector unit. On the other hand it can be determined from the representation that the count lines 81, 82 are correctly positioned with respect to the initialisation regions. If the count lines were positioned further to the left, objects could be missed as a result of not being initialised by the time they crossed the line. All of the image data to the left of the initialisation region 80 results from objects leaving the area since objects entering the area would not have been initialised and would not therefore register in the count data for moving objects.

As noted above the system may be configured to allow a user to adjust one or more parameters against which the one or more object behaviours is judged. This facility may be provided by a user interface at a computing device (e.g.: p.c.) forming part of the system. Thus in the case of the object behaviour being crossing a count line (i.e. entering or leaving a building) the user may be able to move the count line. For example the user may have an interface associated with the view shown in FIG. 4 providing a tool enabling the count line to be repositioned. This could be by the familiar "drag and drop" method for example acting on the points defining the line, or using a drawing tool such as a stylus.

The data shown in FIG. 4 gives an indication of the paths across the area taken by objects in the area following initialisation. It suggests that there is an obstacle in the centre of the illustrated area. By accumulating data over time rather than (or in addition to) instantaneous data a user will have an indication of the introduction of obstacles. This is particularly useful where the radiation being used to detect objects is not visible, such as infra-red. There are scenarios where the use of video cameras is undesirable, e.g. for reasons relating to privacy, and less intrusive forms of detection are preferred.

For a matrix of detectors the storage of the activity map and initialisation data may be with the first (or master) detector for all detectors if there is sufficient data memory available as in the preferred implementation; or, it may be stored on each detector and consolidated by the remote system when viewed. In the latter case only the data memory required for each detector's own part of the coverage is required on each detector.

The system has the additional benefit that it can run continuously to build long periods of historical summary data.

In one preferred implementation, different types of activity are described by discrete probability densities represented by 2-dimensional histograms. For each cell one or more integer valued counters exist of a defined size, for example, 16 bits. Each counter for each cell will be incremented each time a target passes though or exists in the cell meeting additional conditions such as direction vector. Where counters are a finite size the count will eventually reach a maximum. Preferably at this point a test will detect this condition and scale the entire activity map for example by dividing all counters by 2. This principle of scaling the count values can be used with other methods of accumulating the data.

The system may be enhanced by providing a means to store, e.g. in memory, an image or data set of observed behaviours for future reference. In this way the validation technician may consult a past known good image and compare with recent activity. This will enable quick diagnosis of typical problems for example:
- an obstruction causing a new path to be taken by targets
- an obstruction such as a hanging sign blocking the field of view of the detector.
- a change to the installation for example the detector may be attached to a ceiling tile that has been removed and put back in a different place, different orientation or incorrectly placed causing gross or subtle errors.

The foregoing describes a simple histogram technique for determining the frequency distribution of one or more object behaviours over an area in the scene. As noted above other techniques are possible. One is kernel density estimation. Kernel density estimation (of which Gaussian mixture modelling is one example) is a method of probability density function (PDF) estimation based on the weighted summation of a number of individual 'kernels', each an identical symmetrical function. Another related approach is vector quantization (originally used for signal coding) in which the PDF is modelled by the 'point density' of a set of 'prototype vectors' (i.e. the continuous PDF is modelled by the relative density of a cloud of points). In all cases, iterative optimisation algorithms are typically used to update the parameters of the model based on observed data, either in a 'batch-based' approach using a training set, or item-by-item as they are observed. In the case of kernel density estimation/Gaussian mixture models, the expectation-maximisation (EM) algorithm is typically used to train the model in a batch-based manner starting with (quasi-) randomly assigned kernel locations and weights. In the case of vector quantization, a simple training algorithm utilising item-by-item data is typically used, again starting with a set of (quasi-) randomly assigned vectors. Many other training algorithms and model initialisation approaches exist.

If vector quantisation were to be used, for example, to model the 'subject position' PDF modelled in the illustrated example as a 2-D discrete frequency distribution (2-D histogram), the process might start with a set of points positioned randomly over the field of view of the detector and, as subject paths were observed, this set of points would gradually cluster into 'ribbons' reflecting the subject position PDF.

As noted above the system facilitates the detection of faults with the set-up of the system. These can be corrected by an operator but certain fault conditions can be automatically corrected. Some examples are as follows:

Excessive Activity at Line Ends or Count Line Ends in a Region of High Activity:

The count lines would normally be expected to end in areas of low, or zero, flow because if they end in an area of significant flow it would suggest that people beyond the end of the line are not being counted when they probably should be counted. This can readily be detected automatically and an alert could be generated if this fault condition was detected. In the preferred embodiment, the fault condition would be identified by examining the level of activity at the line ends; specifically by locating the histogram 'bin' associated with a line end position and comparing the corresponding relative frequency with a pre-determined threshold value. This threshold value might be chosen, for example, such that the alarm condition is raised if either end of a count line is in a region in which the most densely distributed X % of activity occurs (e.g. take all cells, order by density/frequency, select cells in order of decreasing density/frequency until X % of all activity has been selected). More generally, a fault condition could be determined if a count line is at a point or in a region where the frequency of activity is greater than a predetermined threshold, and the predetermined threshold may be a proportion of the highest detected frequency of activity.

An attempt could be made by the system automatically to correct this fault condition by moving the line end iteratively until a position is reached where the position of a line end is at a point or region where the frequency of activity is below the predetermined threshold. One approach would be to iteratively extend the line ends (within the bounds of the scene viewed by the detector) until each line end passed specified criteria. This extension could be done linearly in the direction of the end line segments in the case of a polyline representation of the count line. A 'polyline' (or 'piecewise linear curve') is a connected series of line segments that approximates a curve; usually represented as an ordered list of vertices between which the line segments are formed. The figures shown use a polyline with a small number of vertices for the count line representation.

Line Crossing Initialisation Region (i.e. "Count Line Too Close to Initialisation Region"):

As noted above, the count lines should be clear of initialisation regions. If an initialisation region extends over or even close to a count line it would indicate that targets are not being tracking in time for them to be counted. This can readily be detected.

In the preferred embodiment, the fault condition would be identified by determining whether the count line overlaps any part of the initialisation region; specifically by considering each segment of the 'polyline' and testing whether any line segments intersect or lie within the closed contours bounding the initialisation region (i.e. the contours which enclose the regions in which the majority of most densely distributed initialisations occur). Alternatively, if the initialisation region were represented as a binary image with each pixel corresponding to a histogram bin, a conventional raster line drawing algorithm could be used to identify the pixels/bins over which the line passes and their presence within the initialisation region tested.

More generally in a situation where objects are counted as they cross a count line a fault could be determined if a count line crosses a region in which the frequency of initialisation exceeds a certain threshold. The boundary of the initialisation region would typically include the points or regions in which the initialisation frequency is above the threshold. Again a method could be used automatically to adjust the position of the count line to bring it out of the initialisation region. One approach would be to iteratively move all polyline vertices except the line ends in a direction consistent with the lines' directionality until the regions were no-longer crossed (such that 'IN' lines would bulge further into the scene and 'OUT' lines bulge further out, since initialisation regions are most likely to occur on the side of the line from which individuals are expected to originate). A modification to this scheme would be to move polyline vertices in the direction opposite to the centre of the offending initialisation region (based on a similar argument).

Insufficient Activity Over Count Line:

This condition would try to capture scenarios where only negligible activity is seen along the count line relative to the rest of the scene, perhaps due to obscuration of the view, detector rotation, or simply line mis-positioning. This condition might be identified in a very similar manner to which line-end activity is judged in the "count line ends in a region of high activity" case; the differences being that all 'bins' crossed by the line would be considered (identified using a conventional raster line drawing algorithm, e.g. Bresenham's) and that ALL identified bins would be required to be BELOW the relative frequency threshold for the condition to be raised. The threshold itself could be determined in the same way.

Count Line Direction Incorrect:

This condition would try to capture scenarios where an 'IN' count line were positioned over an exit or vice versa (within people-counting systems it is typical to identify the direction in which individuals cross a line and only increment the corresponding counter if the line is crossed in the direction of interest). In certain embodiments, the storage of activity is enhanced such that it is possible to differentiate the activity in opposing directions over the count line (e.g. where directionality is directly encoded or activity partitioned into different maps according to direction of line crossing). Then it would be possible, using techniques similar to those already discussed, to identify that the majority of activity over a count line were in a direction opposite to the primary direction of interest. Correction of this fault would be a simple case of inversion of the count line.

Insufficient Activity within Queuing Area

This condition is similar to the "Insufficient activity over count line" people counting condition but within the context of a queue monitoring scenario where a queuing region/area is defined; again the aim would be to capture errors such as obscuration of the view, detector rotation, or simply queuing area mis-positioning. The condition might be identified in a similar way, but considering all histogram bins within the queuing region.

Of course, if multiple activity maps were compiled over differing timescales or sequential time intervals, conditions such as those already described could be tested for in each timescale/interval to look for evidence of transient of time-varying errors.

In certain implementations it may be useful for an operator to have the ability to empty all of the counters and recommence the accumulation of data, for example following adjustment of the system in response to detection of a fault.

Cell counters may be represented as real numbers, e.g. in floating point format.

The system could be readily embellished by sensitising an activity map to target tracks in a particular direction, within a segment (range of directions), or conforming to some other relevant criteria.

A file management system may be used so that the activity map data from one or more detectors can be read with integrity over slow data links.

The apparatus described above may be implemented at least in part in software. Those skilled in the art will appreciate that the apparatus described above may be implemented using general purpose computer equipment or using bespoke equipment.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a mobile station, such as portable computer or possibly handheld mobile device, and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

The invention claimed is:

1. A system for monitoring the activity of objects comprising:
   a detector arranged to receive radiation from a scene;
   readout apparatus for monitoring and processing signals from the detector to identify objects meeting predetermined criteria appearing in the scene and to monitor the activity of identified objects within the scene; and
   data processing and storage apparatus configured to compile statistical data over time indicating the occurrences of two or more object behaviours and to determine the distributions of the two or more object behaviours over respective contiguous areas defining all or part of the scene,
   wherein the system is configured to adjust a parameter against which one of the object behaviours is judged based on a contiguous area of another one of the object behaviours.

2. A system as claimed in claim 1 in which a contiguous area defines a path across or within the scene.

3. A system as claimed in claim 1 comprising further data processing apparatus and a display device, the further data processing apparatus being configured to process the statistical data for rendering on the display device as a visual representation of the scene(s) viewed by the detector(s).

4. A system as claimed in claim 1 configured to enable the user to adjust one or more parameters of the system set-up.

5. A system as claimed in claim 4 in which the system is configured to enable the user to adjust one or more parameters against which the one or more object behaviours is judged.

6. A system as claimed in claim 1 in which the system is configured to enable a user to instruct the data processing apparatus to restart the accumulation of statistical data from a null state.

7. A method for monitoring the operation of a system for monitoring the activity of objects, the system comprising a detector being arranged to receive radiation from a scene and readout apparatus for monitoring and processing signals from the detector to identify objects meeting predetermined criteria appearing in the scene and to monitor the activity of identified objects within the scene, the method comprising the following steps:
- compiling statistical data over time indicating the occurrences of two or more object behaviours;
- determining the distributions of the one or more object behaviours over respective contiguous areas defining all or part of the scene; and
- adjusting a parameter against which one of the object behaviours is judged based on a contiguous area of another one of the object behaviours.

8. A method as claimed in claim 7 in which the predetermined criteria are criteria that an object has to meet in order to be first recognised as an object.

9. A method as claimed in claim 7 in which the object behaviours are selected from the group consisting of:
- a first instance of an object meeting the predetermined criteria;
- an object crossing a region or point;
- an object dwelling at a region or point for more than a certain time; and
- an object leaving a scene.

10. A method as claimed in claim 7 further comprising the step of compiling the statistical data for two or more contiguous areas or two or more sets of regions or points in the scene and dynamically adjusting one or more of the contiguous areas or one or more sets of regions or points in response to a trend in object behaviour determined from the statistical data.

11. A method as claimed in claim 7 further comprising the step of storing the statistical data for each region or point and dividing all of the statistical values by a scaling factor either:
- when a memory location is full; or
- at predetermined intervals.

12. A method as claimed in claim 11 including storing statistical data in respective memory locations for regions or points in a scene, the method including either or both of the steps of:
- dividing values in each memory location using a different scaling factor, and
- dividing values in at least two memory locations by a scaling factor at different time intervals.

13. A method as claimed in claim 7 further comprising generating an alert to indicate a fault with the set-up of the system.

14. A method as claimed in claim 7 further comprising automatically adjusting one or more parameters of the system upon detection of a fault with the set-up of the system.

15. A method as in claim 7 further comprising the step of providing a non-transitory tangible computer readable medium bearing computer readable code executable by one or more processors of a computing system to cause the system to perform the method of claim 7.

* * * * *